(12) United States Patent
Nagahashi et al.

(10) Patent No.: US 7,440,638 B2
(45) Date of Patent: Oct. 21, 2008

(54) IMAGE RETRIEVING SYSTEM, IMAGE CLASSIFYING SYSTEM, IMAGE RETRIEVING PROGRAM, IMAGE CLASSIFYING PROGRAM, IMAGE RETRIEVING METHOD AND IMAGE CLASSIFYING METHOD

(75) Inventors: Toshinori Nagahashi, Tatsuno-machi (JP); Takashi Hyuga, Suwa (JP)

(73) Assignee: Seiko Epson Corporation (JP)

( * ) Notice: Subject to any disclaimer, the term of this patent is extended or adjusted under 35 U.S.C. 154(b) by 740 days.

(21) Appl. No.: 10/857,638

(22) Filed: May 28, 2004

(65) Prior Publication Data
US 2005/0008263 A1 Jan. 13, 2005

(30) Foreign Application Priority Data
May 30, 2003 (JP) ............................. 2003-155886

(51) Int. Cl.
G06K 9/00 (2006.01)
G06K 9/46 (2006.01)
G06K 9/66 (2006.01)
G06K 9/62 (2006.01)

(52) U.S. Cl. ...................... 382/305; 382/118; 382/190; 382/209; 382/224

(58) Field of Classification Search ................ 382/118, 382/181, 203, 206, 209, 224–228; 707/3, 707/4, 6; 348/145
See application file for complete search history.

(56) References Cited

U.S. PATENT DOCUMENTS 5,450,504 A * 9/1995 Calia ........................... 382/118
5,644,765 A * 7/1997 Shimura et al. .......... 707/104.1
6,463,426 B1 10/2002 Lipson et al.
6,728,406 B1 * 4/2004 Murao ........................ 382/191
2001/0043727 A1 11/2001 Cooper
2002/0097145 A1 * 7/2002 Tumey et al. ............... 340/426
2002/0191817 A1 * 12/2002 Sato et al. ................... 382/118

FOREIGN PATENT DOCUMENTS

| EP | 2001/052175 | 2/2001 |
| EP | 2001/126070 | 5/2001 |
| JP | 05-307537 | 11/1993 |
| JP | 2001-052175 | 2/2001 |
| JP | 2001-126070 | 5/2001 |
| WO | WO 01/11489 | 2/2001 |
| WO | WO 02/25588 | 3/2002 |

OTHER PUBLICATIONS

Communication from European Patent Office and European Search Report regarding counterpart application.
Matthew E.J. Wood, et al., "Employing Region Features for Searching an Image Database", Proceedings of the 1997 British Machine Vision Conference (1997) pp. 620-629.
David Beymer, "Feature Correspondence by Interleaving Shape and Texture Computations", Proceedings CVPR '96, 1996 IEEE Computer Society Conference on Computer Vision and Pattern Recognition (1996), pp. 921-928.
Communication from Chinese Patent Office regarding related application.

* cited by examiner

*Primary Examiner*—Brian Q Le
*Assistant Examiner*—Nathan Bloom
(74) *Attorney, Agent, or Firm*—Harness, Dickey & Pierce, P.L.C.

(57) ABSTRACT

An image retrieving system is provided which is suitable for acquiring a retrieving result or a classifying result according to the desire of a user. The system extracts a noticing area from a retrieving key image and each retrieving object image, and a characteristic vector V of these images is generated on the basis of the extracted noticing area. An image similar to the retrieving key image is retrieved from a retrieving object image registration database on the basis of the generated characteristic vector V.

15 Claims, 6 Drawing Sheets

IMAGE RETRIEVING SYSTEM, IMAGE CLASSIFYING SYSTEM, IMAGE RETRIEVING PROGRAM, IMAGE CLASSIFYING PROGRAM, IMAGE RETRIEVING METHOD AND IMAGE CLASSIFYING METHOD

RELATED APPLICATIONS

This application claims priority to Japanese Patent Application No. 2003-155886 filed May 30, 2003 which is hereby expressly incorporated by reference herein in its entirety.

BACKGROUND OF THE INVENTION

1. Technical Field

The present invention relates to a system, a program and a method for retrieving an image adapted for a retrieving key image from plural images, or classifying the plural images. In particular, the present invention relates to an image retrieving system, an image classifying system, an image retrieving program, an image classifying program, an image retrieving method and an image classifying method suitable for acquiring a retrieving result or a classifying result satisfying the desire of a user.

2. Related Art

JP-A-2001-52175 discloses a conventional technique for retrieving an image similar to the retrieving key image from plural retrieving object images on the basis of the given retrieving key image. The image retrieving device described in JP-A-2001-52175 has a characteristic vector extracting section, a reference vector group processing section, a similar degree calculating section, a similar degree judging section and a taking-out section. The characteristic vector extracting section extracts plural characteristic amounts from acquired object image data or reference image data and generates a characteristic vector. The reference vector group processing section makes a reference vector and generates a reference vector group by integrating the characteristic vector extracted in the characteristic vector extracting section and address information of this reference image for each reference image data with respect to the plural acquired reference image data. The similar degree calculating section calculates similar degrees of the characteristic vector extracted in the characteristic vector extracting section from the acquired object image data, and the characteristic vector of the reference image data selected from the reference vector group. The similar degree judging section compares the calculated similar degree with a predetermined standard. The taking-out section takes-out the address information of an image judged as a similar image from the reference vector group.

Here, a color, texture, structural characteristics, or time-like characteristics are used as characteristic amounts of the image. The characteristic amounts are calculated by calculating a density histogram, a simultaneous normal matrix, a differential statistical amount, etc. with respect to the texture, and are also calculated by the convolution of a Laplacian filter, Hough transform, etc. with respect to the structural characteristics of an edge, a line, a contour, etc. The characteristic amounts are also calculated by an RGB space, an HSV space, or conversion into a spectrum, etc. with respect to the color, and are also calculated by the calculation of an optical flow and conversion into a wavelet with respect to the time-like characteristics.

The concept of similarity greatly depends on the subjectivity of a human being. Accordingly, there is a case in which a certain person has a feeling of similarity with respect to an image, but another person has a feeling of non-similarity with respect to this image. Therefore, when the similarity of the image is retrieved, how to define the concept of the similarity is important.

If the entire image and a portion of the image are considered, for example, an image similar as a whole but not similar with respect to a characteristic portion, and an image reversely similar with respect to the characteristic portion but not similar as a whole exist with respect to the retrieving key image. However, it is necessary to appropriately evaluate the similar degree with respect to each of these images. When a user sees the image, the user notices the characteristic portion (a flower portion if it is an image formed by mainly photographing a flower) within the image. Therefore, the user ought to have a feeling in which the image similar with respect to the characteristic portion but not similar as a whole is more similar in comparison with the image similar as a whole but not similar with respect to the characteristic portion. Accordingly, the method for evaluating the similar degree of the image by seriously considering the similar degree with respect to the characteristic portion within the image and lightly considering the similar degree with respect to an uncharacteristic portion is suitable for the actual situation in comparison with the method for evaluating the similarity by gripping the entire image.

However, in the image retrieving device described in JP-A-2001-52175, the characteristic vector is generated by extracting plural characteristic amounts from the entire image data, and the similarity of the image is retrieved on the basis of the generated characteristic vector. Therefore, no similar degree of the image is evaluated in consideration of a portion noticed by the user. Accordingly, a problem exists in that no subjectivity of the user can be sufficiently reflected in the retrieving result, and no retrieving result according to the desire of the user is obtained.

This problem is not limited to the retrieving case of the similarity of the image, but a similar problem is also supposed with respect to a case in which plural images are classified in accordance with their similar degrees. Therefore, the present invention is made by focusing on such an unsolved problem in the prior art, and an object of the present invention is to provide an image retrieving system, an image classifying system, an image retrieving program, an image classifying program, an image retrieving method and an image classifying method suitable for acquiring a retrieving result or a classifying result according to the desire of the user.

SUMMARY

To achieve the above object, the image retrieving system of aspect 1 is an image retrieving system for retrieving an image adapted for a given retrieving key image from plural retrieving object images on the basis of the given retrieving key image, wherein, with respect to the retrieving key image and each retrieving object image, a noticing area is extracted from these images, and a characteristic vector showing a character of the images is generated on the basis of the extracted noticing area, and the image adapted for the retrieving key image is retrieved from the plural retrieving object images on the basis of the generated characteristic vector.

In accordance with such a construction, when the retrieving key image is given, the noticing area is extracted from the retrieving key image, and the characteristic vector showing the character of the retrieving key image is generated on the basis of the extracted noticing area. Similarly, the noticing area is extracted from the retrieving object image for each retrieving object image, and the characteristic vector showing the character of this retrieving object image is generated on the basis of the extracted noticing area. The image adapted for the retrieving key image is retrieved from the plural retrieving object images on the basis of the generated characteristic vector.

Thus, since the retrieval is performed in consideration of a portion noticed by a user, the subjectivity of the user is reflected in the retrieving result. Accordingly, in comparison with the conventional case, the effect of being able to obtain the retrieving result comparatively adapted for a desire of the user is obtained. Here, the noticing area is an area considered to be noticed by the user within the retrieving key image or the retrieving object image. In the following description, the same contents hold true for the image retrieving system of aspect 2, the image classifying systems of aspects 8 and 9, the image retrieving program of aspect 14, the image classifying program of aspect 15, the image retrieving method of aspect 16 and the image classifying method of aspect 17.

Further, this system may be realized as single device, terminal and other devices, and may be also realized as a network system for communicably connecting plural devices, terminals and other devices. In the latter case, each constructional element may belong to one of the plural devices, etc. if each constructional element is communicably connected. In the following description, the same contents hold true for the image retrieving system of aspect 2 and the image classifying systems of aspects 8 and 9.

Further, the image retrieving system of aspect 2 is an image retrieving system for retrieving an image adapted for a given retrieving key image from plural retrieving object images on the basis of the given retrieving key image; wherein the image retrieving system comprises retrieving object image storage means for storing the plural retrieving object images; retrieving key image inputting means for inputting the retrieving key image; noticing area extracting means for extracting a noticing area from the images with respect to the retrieving key image inputted by the retrieving key image inputting means and each retrieving object image of the retrieving object image storage means; characteristic vector generating means for generating a characteristic vector showing a character of the images on the basis of the noticing area extracted by the noticing area extracting means with respect to the retrieving key image and each retrieving object image; and image retrieving means for retrieving the image adapted for the retrieving key image from the retrieving object image storage means on the basis of the characteristic vector generated by the characteristic vector generating means.

In accordance with such a construction, when the retrieving key image is inputted from the retrieving key image inputting means, the noticing area is extracted from the inputted retrieving key image by the noticing area extracting means. The characteristic vector showing the character of the retrieving key image is generated by the characteristic vector generating means on the basis of the extracted noticing area. Similarly, the noticing area is extracted from the retrieving object image by the noticing area extracting means for each retrieving object image of the retrieving object image storage means, and the characteristic vector showing the character of this retrieving object image is generated by the characteristic vector generating means on the basis of the extracted noticing area. The image adapted for the retrieving key image is retrieved from the retrieving object image storage means by the image retrieving means on the basis of the generated characteristic vector.

Thus, since the retrieval is performed in consideration of a portion noticed by a user, the subjectivity of the user is reflected in the retrieving result. Accordingly, in comparison with the conventional case, the effect of being able to obtain the retrieving result comparatively adapted for a desire of the user is obtained. Here, it is sufficient for the noticing area extracting means to extract the noticing area from the images with respect to the retrieving key image and each retrieving object image. For example, a conspicuous degree is calculated on the basis of the retrieving key image or the retrieving object image, and the noticing area can be extracted on the basis of the calculated conspicuous degree. In the following description, the same contents hold true for the image classifying system of aspect 9, the image retrieving program of aspect 14 and the image classifying program of aspect 15.

Further, the retrieving key image inputting means may be set to have any construction if the retrieving key image inputting means is constructed so as to input the retrieving key image. For example, the retrieving key image inputting means may be constructed so as to input the retrieving object image selected from the retrieving object image storage means as the retrieving key image. Further, the retrieving key image inputting means may be also constructed so as to input the retrieving key image from an image storage medium, a network or another image storage means. In the following description, the same contents hold true for the image classifying system of aspect 9, the image retrieving program of aspect 14 and the image classifying program of aspect 15.

Further, the retrieving object image storage means stores the retrieving object image by any means in any periods, and may also store the retrieving object image in advance. Further, the retrieving object image may be also stored by an input, etc. from the exterior at the operating time of this system without storing the retrieving object image in advance.

Further, the image retrieving system of aspect 3 is the image retrieving system of aspect 2, wherein the image retrieving system further comprises face information judging means for judging face information of a person image included in the images with respect to the retrieving key image and each retrieving object image, and the characteristic vector generating means generates the characteristic vector showing the character of the images on the basis of the face information judged by the face information judging means with respect to the retrieving key image and each retrieving object image.

In accordance with such a construction, the face information of the person image included in the retrieving key image is judged by the face information judging means, and the characteristic vector showing the character of the retrieving key image is generated by the characteristic vector generating means on the basis of the judged face information. Similarly, the face information of the person image included in this retrieving object image is judged by the face information judging means for each retrieving object image. The characteristic vector showing the character of this retrieving object image is generated by the characteristic vector generating means on the basis of the judged face information.

Thus, since the retrieval is performed in consideration of the face information of the person image, the effect of being able to obtain a retrieving result adapted for the face of the person image included in the retrieving key image is also obtained.

Further, the image retrieving system of aspect 4 is the image retrieving system of aspect 2 or 3, wherein the image retrieving system further comprises similar degree judging means for judging similar degrees of the face of a person image included in the retrieving object image and the face of a person image included in the retrieving key image for each retrieving object image, and the characteristic vector generating means generates the characteristic vector showing the character of the images on the basis of the judging result of the similar degree judging means with respect to the retrieving key image and each retrieving object image.

In accordance with such a construction, the similar degrees of the face of the person image included in this retrieving object image and the face of the person image included in the retrieving key image are judged by the similar degree judging means for each retrieving object image. The characteristic vector showing the character of the retrieving key image and the characteristic vector showing the character of each retrieving object image are generated by the characteristic vector generating means on the basis of its judging result.

Thus, since the retrieval is performed in consideration of the similar degrees of the faces of the person images, the effect of being able to obtain a retrieving result similar to that of the face of the person image included in the retrieving key image is also obtained.

Further, the image retrieving system of aspect 5 is the image retrieving system of any one of aspects 2 to 4, wherein the image retrieving means is constructed such that the retrieving object image corresponding to the characteristic vector having a smallest inter-vector distance with respect to the characteristic vector of the retrieving key image is retrieved and outputted from the retrieving object image storage means.

In accordance with such a construction, the retrieving object image corresponding to the characteristic vector having the smallest inter-vector distance with respect to the characteristic vector of the retrieving key image is retrieved and outputted by the image retrieving means from the retrieving object image storage means. Thus, the effect of being able to obtain a retrieving result considered to be most adaptable to a desire of the user is also obtained.

Further, the image retrieving system of aspect 6 is the image retrieving system of any one of aspects 2 to 4, wherein the image retrieving means is constructed such that each retrieving object image is classified into plural groups on the basis of the inter-vector distance between the characteristic vectors of the retrieving object image, and all the retrieving object images to which the retrieving key image belongs within the plural groups are retrieved and outputted from the retrieving object image storage means.

In accordance with such a construction, each retrieving object image is classified into the plural groups by the image retrieving means on the basis of the inter-vector distance between the characteristic vectors of the retrieving object image. Further, all the retrieving object images to which the retrieving key image belongs within the plural groups are retrieved and outputted from the retrieving object image storage means. Thus, the effect of being able to obtain some retrieving results considered to be adaptable to a desire of the user is obtained.

Further, the image retrieving system of aspect 7 is the image retrieving system of any one of aspects 2 to 6, wherein, when the aspect ratios of the retrieving key image and the retrieving object image or the aspect ratios of the retrieving object images are different from each other, the characteristic vector generating means overlaps first and second images having the different aspect ratios, and generates the characteristic vector of the first image with respect to the overlapping area within the first image, and also generates the characteristic vector of the second image with respect to the overlapping area within the second image.

In accordance with such a construction, when the aspect ratios of the retrieving key image and the retrieving object image, or the aspect ratios of the retrieving object images are different, the first and second images of the different aspect ratios are overlapped by the characteristic vector generating means. The characteristic vector of the first image is generated with respect to the overlapping area within the first image. The characteristic vector of the second image is generated with respect to the overlapping area within the second image.

Thus, the similarity can be comparatively accurately judged even in the images of the different aspect ratios. Accordingly, the effect of being able to obtain a retrieving result further adaptable to the desire of the user is also obtained.

On the other hand, to achieve the above object, the image classifying system of aspect 8 is an image classifying system for classifying plural classifying object images and constructed such that a noticing area is extracted from the classifying object images for each classifying object image, and a characteristic vector showing a character of the classifying object images is generated on the basis of the extracted noticing area, and each classifying object image is classified into plural groups on the basis of the generated characteristic vector.

In accordance with such a construction, the noticing area is extracted from the classifying object image for each classifying object image, and the characteristic vector showing the character of this classifying object image is generated on the basis of the extracted noticing area. Each classifying object image is then classified into plural groups on the basis of the generated characteristic vector. Thus, since the classification is performed in consideration of a portion noticed by a user, the subjectivity of the user is reflected in the classifying result. Accordingly, in comparison with the conventional case, the effect, of being able to obtain the classifying result comparatively adaptable to the desire of the user is obtained.

Further, the image classifying system of aspect 9 is an image classifying system for classifying plural classifying object images, and comprising classifying object image storage means for storing the plural classifying object images; noticing area extracting means for extracting a noticing area from the classifying object images for each classifying object image of the classifying object image storage means; characteristic vector generating means for generating a characteristic vector showing a character of the classifying object image for each classifying object image on the basis of the noticing area extracted by the noticing area extracting means; and image classifying means for classifying each classifying object image into plural groups on the basis of the characteristic vector generated by the characteristic vector generating means.

In accordance with such a construction, the noticing area is extracted from this classifying object image by the noticing area extracting means for each classifying object image of the classifying object image storage means. The characteristic vector showing the character of this classifying object image is generated by the characteristic vector generating means on the basis of the extracted noticing area. Each classifying object image is classified into plural groups by the image classifying means on the basis of the generated characteristic vector.

Thus, since the classification is performed in consideration of a portion noticed by a user, the subjectivity of the user is reflected in a classifying result. Accordingly, in comparison with the conventional case, the effect of being able to obtain the classifying result comparatively adaptable to a desire of the user is obtained. Here, the classifying object image storage means stores the classifying object image by any means in any periods, and may store the classifying object image in advance. Further, the classifying object image storage means may also store the classifying object image by an input, etc. from the exterior at the operating time of this system without storing the classifying object image in advance.

Further, the image classifying system of aspect 10 is the image classifying system of aspect 9, wherein the image classifying system further comprises face information judging means for judging face information of a person image included in the classifying object image for each classifying object image, and the characteristic vector generating means generates the characteristic vector showing the character of the classifying object image for each classifying object image on the basis of the face information judged by the face information judging means.

In accordance with such a construction, the face information of the person image included in this classifying object image is judged by the face information judging means for each classifying object image. Further, the characteristic vector showing the character of this classifying object image is generated by the characteristic vector generating means on the basis of the judged face information. Thus, since the classification is performed in consideration of the face information of the person image, the effect of being able to obtain a classifying result in which the images adapted for the face of the person image belong to the same group, is also obtained.

Further, the image classifying system of aspect 11 is the image classifying system of aspect 9 or 10, wherein the image classifying system further comprises similar degree judging means for judging similar degrees of the face of a person image included in the classifying object image for each classifying object image and the face of a person image included in a specific image, and the characteristic vector generating means generates the characteristic vector showing the character of the classifying object image for each classifying object image on the basis of the judging result of the similar degree judging means.

In accordance with such a construction, the similar degrees of the face of the person image included in this classifying object image and the face of the person image included in the specific image are judged by the similar degree judging means for each classifying object image. The characteristic vector showing the character of this classifying object image is generated by the characteristic vector generating means on the basis of its judging result. Thus, since the classification is performed in consideration of the similar degrees of the faces of the person images, the effect of being able to obtain a classifying result in which the similar images of the faces of the person images belong to the same group, is also obtained.

Further, the image classifying system of aspect 12 is the image classifying system of any one of aspects 9 to 11, wherein the image classifying means classifies each classifying object image into the plural groups on the basis of the inter-vector distance between the characteristic vectors of the classifying object image, and a predetermined number of classifying object images are retrieved and outputted from the classifying object image storage means for each group.

In accordance with such a construction, each classifying object image is classified into plural groups by the image classifying means on the basis of the inter-vector distance between the characteristic vectors of the classifying object image. A predetermined number of classifying object images are retrieved and outputted from the classifying object image storage means for each group. Thus, since a predetermined number of classifying object images are retrieved and outputted from a different group, the effect of being able to obtain various retrieving results is also obtained.

Further, the image classifying system of aspect 13 is the image classifying system of any one of aspects 9 to 12, wherein, when the aspect ratios of the classifying object images are different from each other, the characteristic vector generating means overlaps first and second images having the different aspect ratios, and generates the characteristic vector of the first image with respect to the overlapping area within the first image, and also generates the characteristic vector of the second image with respect to the overlapping area within the second image.

In accordance with such a construction, when the aspect ratios of the classifying object images are different from each other, the first and second images of the different aspect ratios are overlapped by the characteristic vector generating means. The characteristic vector of the first image is generated with respect to the overlapping area within the first image. The characteristic vector of the second image is generated with respect to the overlapping area within the second image. Thus, the similarity can be comparatively accurately judged even in the images of the different aspect ratios. Accordingly, the effect of being able to obtain a classifying result further adaptable to the desire of the user is also obtained.

On the other hand, to achieve the above object, the image retrieving program of aspect 14 is an image retrieving program for retrieving an image adapted for a given retrieving key image from plural retrieving object images on the basis of the given retrieving key image, and characterized in that the image retrieving program is a program for executing processing realized as noticing area extracting means for extracting a noticing area from the images with respect to the retrieving key image inputted by retrieving key image inputting means and each retrieving object image of retrieving object image storage means about a computer capable of utilizing the retrieving object image storage means for storing the plural retrieving object images and the retrieving key image inputting means for inputting the retrieving key image; characteristic vector generating means for generating a characteristic vector showing a character of the images on the basis of the noticing area extracted by the noticing area extracting means with respect to the retrieving key image and each retrieving object image; and image retrieving means for retrieving the image adapted for the retrieving key image from the retrieving object image storage means on the basis of the characteristic vector generated by the characteristic vector generating means.

In accordance with such a construction, when the program is read by the computer and the computer executes the processing in accordance with the read program, an operation and an effect equal to those of the image retrieving system of aspect 2 are obtained.

On the other hand, to achieve the above object, the image classifying program of aspect 15 is an image classifying program for classifying plural classifying object images, and characterized in that the image classifying program is a program for executing processing realized as noticing area extracting means for extracting a noticing area from the classifying object image for each classifying object image of classifying object image storage means with respect to a computer capable of utilizing the classifying object image storage means for storing the plural classifying object images; characteristic vector generating means for generating a characteristic vector showing a character of the classifying object image for each classifying object image on the basis of the noticing area extracted by the noticing area extracting means; and image classifying means for classifying each classifying object image into plural groups on the basis of the characteristic vector generated by the characteristic vector generating means.

In accordance with such a construction, when the program is read by the computer and the computer executes the processing in accordance with the read program, an operation and an effect equal to those of the image classifying system of aspect 9 are obtained.

On the other hand, to achieve the above object, the image retrieving method of aspect 16 is an image retrieving method for retrieving an image adapted for a given retrieving key image from retrieving object image storage means storing plural retrieving object images thereto on the basis of the given retrieving key image, and including a retrieving key image inputting step for inputting the retrieving key image; a first noticing area extracting step for extracting a noticing area from the retrieving key image inputted in the retrieving key image inputting step; a first characteristic vector generating step for generating a characteristic vector showing a character of the retrieving key image on the basis of the noticing area extracted in the first noticing area extracting step; a second noticing area extracting step for extracting the noticing area from the retrieving object image; a second characteristic vector generating step for generating a characteristic vector showing a character of the retrieving object image on the basis of the noticing area extracted in the second noticing area extracting step; a repeating step for repeatedly executing the second noticing area extracting step and the second characteristic vector generating step for each retrieving object image of the retrieving object image storage means; and an image retrieving step for retrieving the image adapted for the retrieving key image from the retrieving object image storage means on the basis of the characteristic vectors generated in the first characteristic vector generating step and the second characteristic vector generating step.

Thus, effects equal to those of the image retrieving system of aspect 2 are obtained. Here, in the noticing area extracting step, it is sufficient to extract the noticing area from the images with respect to the retrieving key image and each retrieving object image. For example, a conspicuous degree is calculated on the basis of the retrieving key image or the retrieving object image, and the noticing area can be extracted on the basis of the calculated conspicuous degree. In the following description, the same contents hold true for the image classifying method of aspect 17.

Further, the retrieving key image inputting step may be set to any method if the retrieving key image is inputted. For example, the retrieving object image selected from the retrieving object image storage means may be inputted as the retrieving key image, and the retrieving key image may be also inputted from an image storage medium, a network or another image storage means.

On the other hand, to achieve the above object, the image classifying method of aspect 17 is an image classifying method for classifying plural classifying object images, and including a noticing area extracting step for extracting a noticing area from the classifying object images; a characteristic vector generating step for generating a characteristic vector showing a character of the classifying object image on the basis of the noticing area extracted in the noticing area extracting step; a repeating step for repeatedly executing the noticing area extracting step and the characteristic vector generating step for each classifying object image; and an image classifying step for classifying each classifying object image into plural groups on the basis of the characteristic vector generated in the characteristic vector generating step.

Thus, effects equal to those of the image classifying system of aspect 9 are obtained.

DETAILED DESCRIPTION

The embodiments of the present invention will next be explained with reference to the drawings. FIGS. 1 to 7 are views showing the embodiments of an image retrieving system, an image classifying system, an image retrieving program, an image classifying program, an image retrieving method and an image classifying method in the present invention.

In these embodiments, the image retrieving system, the image classifying system, the image retrieving program, the image classifying program, the image retrieving method and the image classifying method in the present invention are applied when the similarity of an image is retrieved in consideration of a portion noticed by a user. In these embodiments, the concept of "a conspicuous degree" is used as an extracting standard of a portion (hereinafter called a "noticing area") considered to be noticed by the user within the image. For example, a calculating method of the conspicuous degree is disclosed in detail in JP-A-2001-126070 (a noticing area extracting device and an automatic composition determining device using this noticing area extracting device).

The conspicuous degree will be briefly explained. The conspicuous degree is evaluated in accordance with a physical character of the original image to extract the noticing area. Here, the conspicuous degree is a parameter conformed to the subjectivity of a human being. In the extraction of the noticing area, a most conspicuous area is extracted as the noticing area from an evaluating result. Namely, in the evaluation of the noticing area, the noticing area is evaluated in conformity with the subjectivity of the human being in accordance with the physical character. Accordingly, the noticing area adapted for the subjectivity of the human being can be extracted.

For example, when the physical character includes the heterogeneous degree of a color, the conspicuous degree can be evaluated on the basis of a difference in the color of each area. Further, in addition to the heterogeneous degree of the color, the physical character further includes the heterogeneous degree of a shape, the heterogeneous degree of an area and the heterogeneous degree of texture (pattern). Accordingly, if the conspicuous degree is evaluated on the basis of at least one of these four heterogeneous degrees, the conspicuous degree can be precisely evaluated in accordance with the characters of the original image.

Further, if three elements (hue, chroma, brightness) of the color are also evaluated, an area near a conspicuous color (red color) using the subjectivity of the human being can be evaluated as a most conspicuous area. Further, if a spatial frequency and the area of each region in the original image are also evaluated, the evaluation of the most conspicuous area can be further precisely judged.

The conspicuous degree is further evaluated by the following procedures. (1) The original image is first divided into areas. In this case, the original image is divided into a figure area and a picture area. In the method of the area division, a boundary detecting method based on an "edge flow" described in "Edge Flow: A Framework of Boundary Detection and Image Segmentation" by W. Y. Ma and B. S. Manjunath et al. in 1997 IEEE is applied. (2) Next, the divided figure area is extracted and the conspicuous degree of the area is evaluated.

The conspicuous degree is schematically evaluated as follows. First, a heterogeneous conspicuous degree of each area is calculated. In this case, the heterogeneous degree of a color, the heterogeneous degree of texture, the heterogeneous degree of a shape and the heterogeneous degree of an area are respectively calculated. Weight coefficients are then given to these heterogeneous degrees, and are linearly connected, and the heterogeneous conspicuous degree of each area is calculated. Next, a characteristic conspicuous degree in each area is calculated. In this case, the conspicuous degree of the color, the conspicuous degree of the spatial frequency and the conspicuous degree of the area are calculated. Weight coefficients are respectively given to these conspicuous degrees and are linearly connected, and the characteristic conspicuous degree of each area is calculated.

Next, the heterogeneous conspicuous degree and the characteristic conspicuous degree of each area are added and a characteristic amount integrating value is calculated and is evaluated by a predetermined beta function so that the conspicuous degree is calculated. (3) Further, a pattern figure obtained by evaluating the conspicuous degree from the original image is generated. Next, the construction of an image retrieving device 100 in accordance with the present invention will be explained with reference to FIG. 1.

Figure 1:
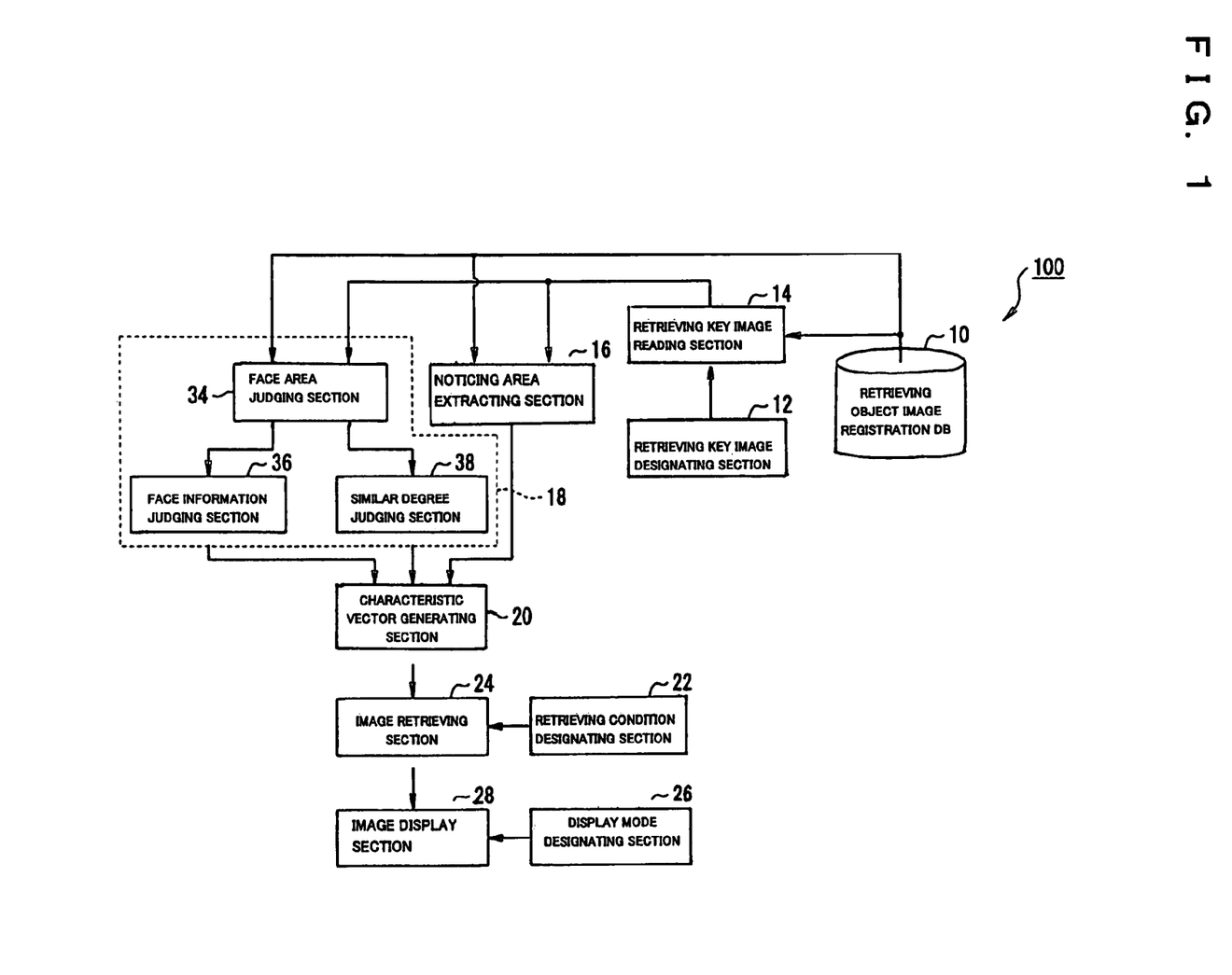
FIG. 1 is a functional block diagram showing the construction of an image retrieving device in accordance with the present invention.

FIG. 1 is a functional block diagram showing the construction of the image retrieving device 100 in accordance with the present invention. As shown in FIG. 1, the image retrieving device 100 is constructed by arranging a retrieving object image registration database (hereinafter, the database is simply described as DB) 10 for registering plural retrieving object images, a retrieving key image designating section 12 for designating a retrieving key image, and a retrieving key image reading section 14 for reading a retrieving object image designated by the retrieving key image designating section 12 as the retrieving key image from the retrieving object image registration DB 10. Further, the image retrieving device 100 is constructed by arranging a noticing area extracting section 16, a face image processing section 18 and a characteristic vector generating section 20. With respect to the retrieving key image read by the retrieving key image reading section 14 and each retrieving object image of the retrieving object image registration DB 10, the noticing area extracting section 16 extracts a noticing area from these images. The face image processing section 18 judges face information and a similar degree with respect to the retrieving key image read by the retrieving key image reading section 14 and each retrieving object image of the retrieving object image registration DB 10. The characteristic vector generating section 20 generates a characteristic vector showing a character of the image on the basis of the noticing area extracted by the noticing area extracting section 16 and the judging result of the face image processing section 18. The image retrieving device 100 is further constructed by arranging a retrieving condition designating section 22 for designating a retrieving condition, an image retrieving section 24, a display mode designating section 26 and an image display section 28. The image retrieving section 24 retrieves an image from the retrieving object image registration DB 10 on the basis of the retrieving condition designated by the retrieving condition designating section 22 and the characteristic vector generated by the characteristic vector generating section 20. The display mode designating section 26 designates a display mode of the retrieving result. The image display section 28 displays the image of the retrieving result in the display mode designated by the display mode designating section 26.

The face image processing section 18 is constructed by arranging a face area judging section 34, a face information judging section 36 and a similar degree judging section 38. With respect to the retrieving key image read by the retrieving key image reading section 14 and each retrieving object image of the retrieving object image registration DB 10, the face area judging section 34 judges whether these images include an area (hereinafter called a "face area") corresponding to the face of a person image or not. The face information judging section 36 judges the direction, the size and the gravity center position of the face of the person image included in the images on the basis of the judging result of the face area judging section 34. The similar degree judging section 38 judges the similar degrees of the face of the person image included in the retrieving object image and the face of the person image included in the retrieving key image for each retrieving object image on the basis of the judging result of the face area judging section 34.

Figure 2:
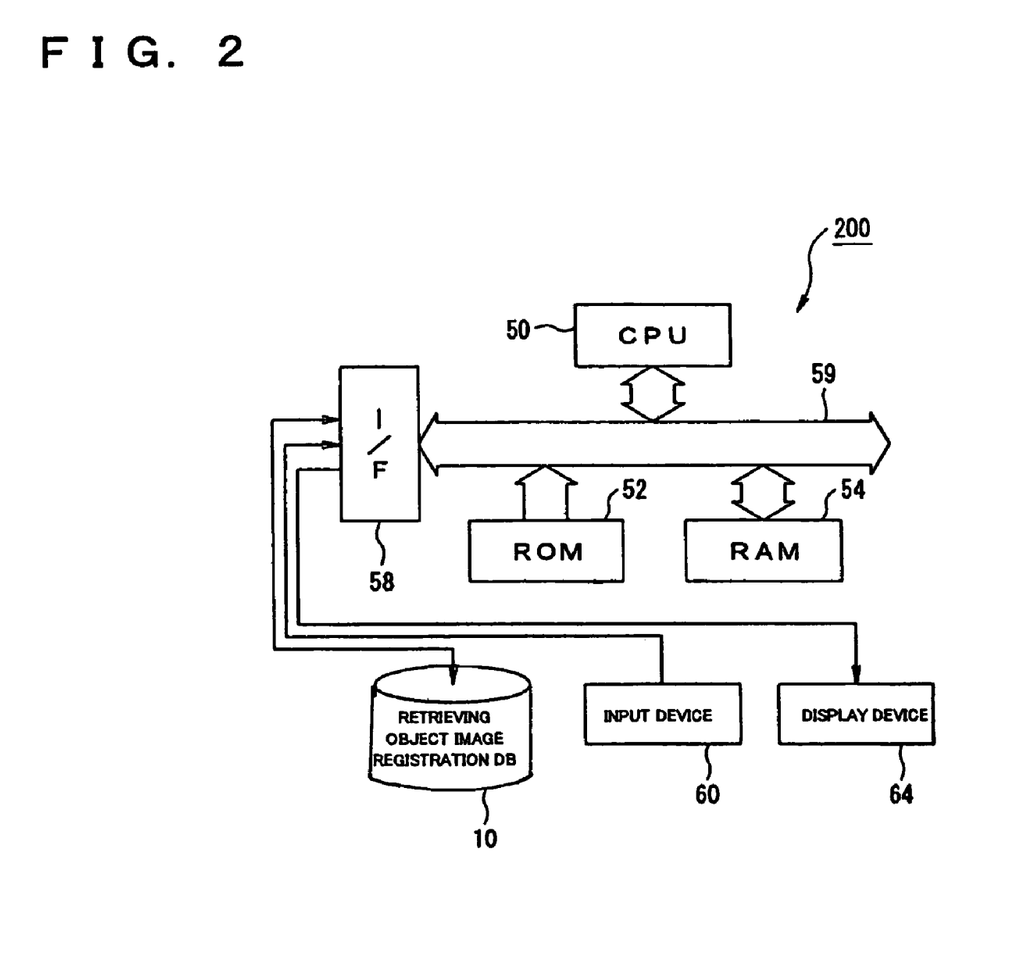
FIG. 2 is a block diagram showing the construction of a computer.

In particular, as shown in FIG. 2, the image retrieving device 100 can be realized as a computer 200 and a program executed by this computer 200. The construction of the computer 200 will be explained with reference to FIG. 2. FIG. 2 is a block diagram showing the construction of the computer 200. As shown in FIG. 2, the computer 200 is constructed by a CPU 50 for controlling an arithmetic operation and the operation of an entire system on the basis of a control program, a ROM 52 for storing the control program of the CPU 50, etc. to a predetermined area in advance, a RAM 54 for storing data read from the ROM 52, etc. and an arithmetic result required in an arithmetic process of the CPU 50, and an I/F 58 for interfacing the input and output of data with respect to an external device. These sections are connected to each other so as to give and receive data by a bus 59 as a signal line for transferring data.

The retrieving object image registration DB 10, an input device 60 and a display device 64 as external devices are connected to the I/F 58. The input device 60 can input data as a human interface and is constructed by a keyboard, a mouse, etc. The display device 64 displays the screen on the basis of an image signal. The CPU 50 is constructed by a micro processing unit (MPU), etc., and starts a predetermined program stored to a predetermined area of the ROM 52, and executes image retrieval processing shown in the flow chart of FIG. 3 in accordance with this program.

Figure 3:
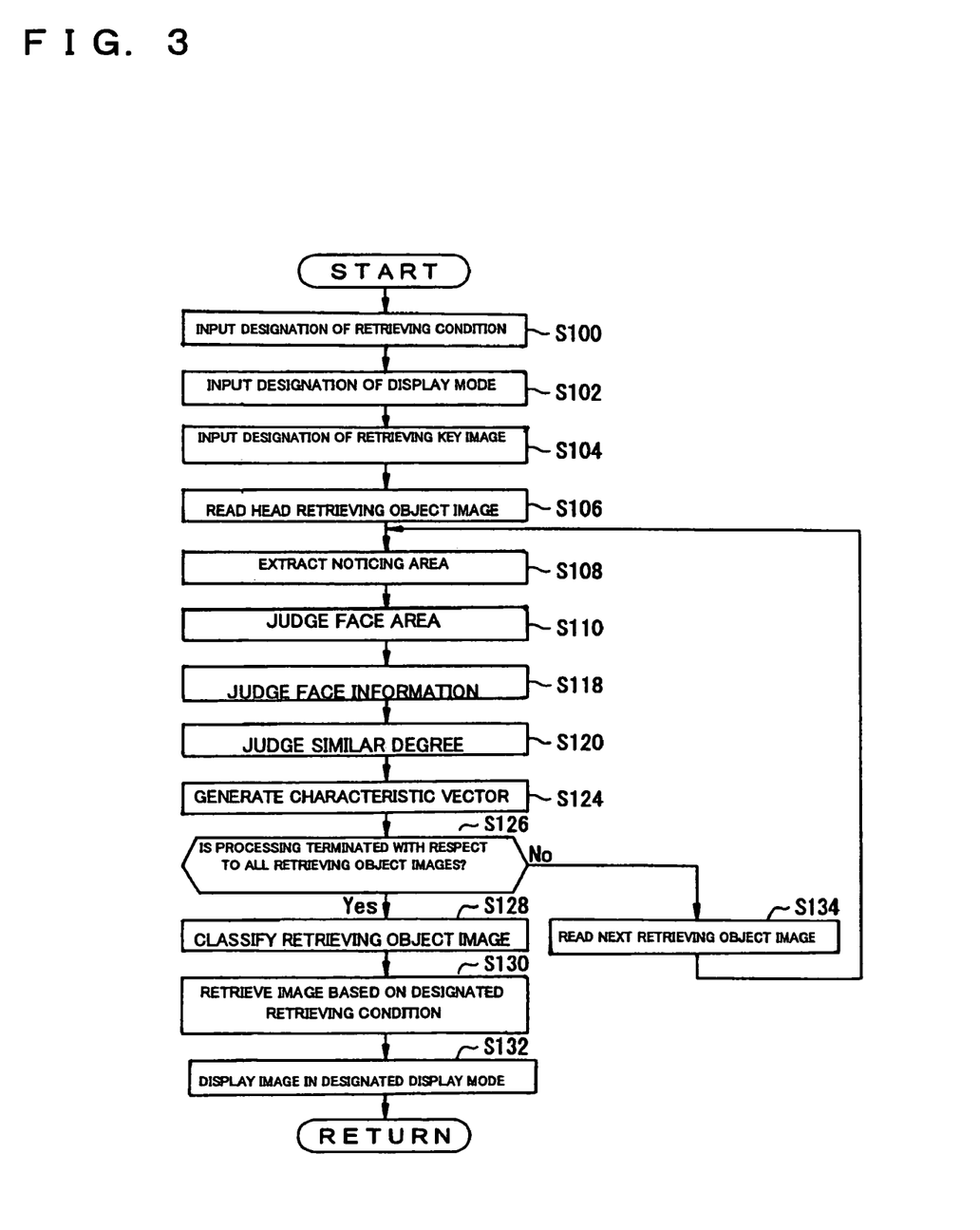
FIG. 3 is a flow chart showing image retrieval processing.

FIG. 3 is a flow chart showing the image retrieval processing. The image retrieval processing is processing executed by receiving the input of a retrieving request from the input device 60. When the image retrieval processing is executed in the CPU 50, the process first proceeds to a step S100 as shown in FIG. 3. In the step S100, the designation of a retrieving condition is inputted. As the retrieving condition, it is possible to designate a similar image retrieving mode for retrieving an image most similar to the retrieving key image from the retrieving object image registration DB 10, a similar image group retrieving mode for retrieving plural images similar to the retrieving key image from the retrieving object image registration DB 10, and a variety retrieving mode for retrieving plural images of different natures from the retrieving object image registration DB 10.

Next, the process proceeds to a step S102, and the designation of a display mode is inputted. As the display mode, it is possible to designate an enlargement display mode for enlarging and displaying an image conformed to the retrieving condition and reducing and displaying an image not conformed to the retrieving condition, and a clear display mode for clearly displaying the image conformed to the retrieving condition and gradating and displaying the image not conformed to the retrieving condition.

Next, the process proceeds to a step S104, and the retrieving key image is designated from the retrieving object image registration DB 10. When the variety retrieving mode is designated as the retrieving condition, no designation of the retrieving key image is required. The following processings of steps S106 to S126 and S134 are performed with respect to all the retrieving object images including the retrieving key image.

Next, the process proceeds to the step S106, and a head retrieving object image is read from the retrieving object image registration DB 10, and the process proceeds to a step S108. In the step S108, the conspicuous degree is calculated on the basis of the read retrieving object image, and the noticing area is extracted on the basis of the calculated conspicuous degree. The noticing area is extracted by the above method. Since the absolute value of the conspicuous degree is influenced by the retrieving object image in a certain case, the conspicuous degree is normalized and the noticing degree of the noticing area is divided into predetermined stages (e.g., 10 stages) to equally evaluate all the retrieving object images. In the following description, the conspicuous degree calculated with respect to each pixel constituting the retrieving object image is set to $e'_{xy}$. The values x and y respectively show the X and Y coordinates of the pixel in the retrieving object image.

Figure 4A:
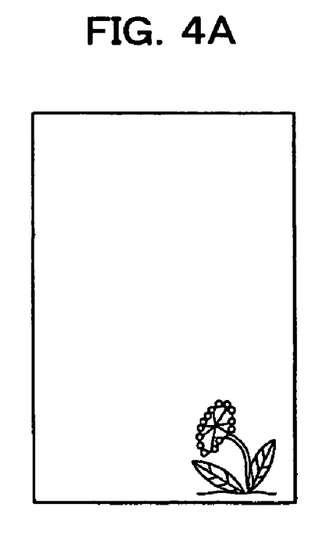
FIGS. 4A and B are portrait views showing one example of a retrieving object image.
Figure 4B:
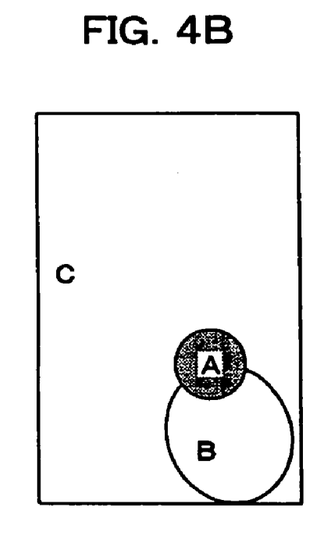

FIGS. 4A and B are portrait views showing one example of the retrieving object image. In the example of FIG. 4(*a*), a photographing direction is set to the longitudinal direction, and a flower image is arranged at the lower right. In this case, when the noticing area is calculated, for example, as shown in FIG. 4(*b*), a portion of the flower and an area corresponding to its vicinity within the flower image are extracted as a noticing area A having a highest noticing degree. A stalk and leaf portion and an area corresponding to its vicinity within the flower image are extracted as a noticing area B having a second highest noticing degree. The other areas are extracted as an area C having a low noticing degree.

Figure 5A:
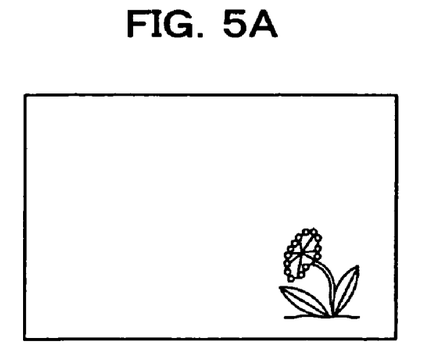
FIGS. 5A and B are landscape views showing one example of a retrieving object image.
Figure 5B:
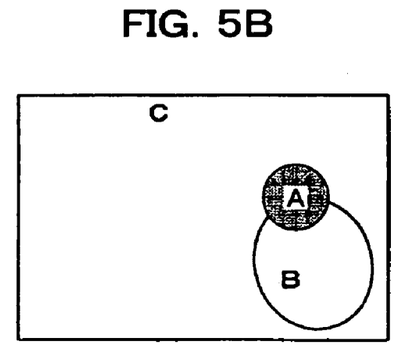

FIGS. 5A and B are landscape views showing one example of the retrieving object image. In the example of FIG. 5(*a*), the photographing direction is set to the transversal direction, and a flower image is arranged at the lower right. In this case, when the noticing area is calculated, for example, as shown in FIG. 5(*b*), a flower portion and an area corresponding to its vicinity within the flower image are extracted as a noticing area A having a highest noticing degree. A stalk and leaf portion and an area corresponding to its vicinity within the flower image are extracted as a noticing area B having a second highest noticing degree. The other areas are extracted as an area C having a low noticing degree. Thus, it is understood that areas approximately similar to those of the retrieving object image of FIG. 4 are extracted in similar noticing degrees.

Next, the process proceeds to a step S110, and it is judged whether a face area is included in the read retrieving object image or not, and the process proceeds to a step S118. In the step S118, the direction, the size and the gravity center position of the face of a person image included in the retrieving object image are judged on the basis of the judging result of the step S110. In particular, it is supposed that plural face areas are included within the retrieving object image. When these plural face areas are set to a detecting face area group, the image retrieving device calculates the sum total f1 of an area occupied within the retrieving object image of the detecting face area group, an average value f2 of the area occupied within the retrieving object image of the detecting face area group, and dispersion f3 of the area occupied within the retrieving object image of the detecting face area group. The image retrieving device also calculates an average value f4 ($-\pi/2$ to $\pi/2$) of a horizontal direction front face directing degree as to how much each face of the detecting face area group is directed to the front face in the horizontal direction, dispersion f5 of the horizontal direction front face directing degree of each face of the detecting face area group, and an average value f6 ($-\pi/2$ to $\pi/2$) of a perpendicular direction front face directing degree as to how much each face of the detecting face area group is directed to the front face in the perpendicular direction. The image retrieving device also calculates dispersion f7 of the perpendicular direction front face directing degree of each face of the detecting face area group, an average value f8 of each gravity center position of the detecting face area group, and dispersion f9 of each gravity center position of the detecting face area group. When only one face area is included within the retrieving object image, the area of this face area is calculated with respect to f1 and f2, and the horizontal direction front face directing degree and the perpendicular direction front face directing degree of this face area are respectively calculated with respect to f4 and f6. The horizontal direction front face directing degree becomes a smaller value as the face of the detecting face area is inclined in the horizontal direction with the front face as a standard. The perpendicular direction front face directing degree becomes a smaller value as the face of the detecting face area is inclined in the perpendicular direction with the front face as a standard. In the following description, the horizontal direction front face directing degree and the perpendicular direction front face directing degree are generally called a front face directing degree except for a case in which the horizontal direction front face directing degree and the perpendicular direction front face directing degree are particularly distinguished from each other. Further, the area of the face area is normalized and calculated at the size of the retrieving object image.

Next, the process proceeds to a step S120, and the similar degrees of the face of a person image included in the retrieving object image and the face of a person image included in the retrieving key image are judged. For example, when the person images of photographed bodies A, B, C are included in the retrieving key image, the similar degree to the face of the face area of the photographed body A, the similar degree to the face of the face area of the photographed body B, and the similar degree to the face of the face area of the photographed body C are respectively judged for each face area included in the retrieving object image. When the variety retrieving mode is designated as the retrieving condition, no retrieving key image exists. Accordingly, the similar degrees of the face of the person image included in the retrieving object image and the face of a person image included in a specific image set in advance are judged.

Next, the process proceeds to a step S124, and a characteristic vector V of the retrieving object image is generated on the basis of the noticing area extracted in the step S108 and the judging results of steps S118, S120. The characteristic vector V is generally constructed by a first element group according to the conspicuous degree of the noticing area, a second element group according to face information f1 to f9, and a third element group according to the similar degree.

In the first element group of the characteristic-vector V, the retrieving object image is divided into plural areas (e.g., rectangular areas constructed by N-areas in the horizontal direction and M-areas in the perpendicular direction). An average value $e_{ij}$ of the conspicuous degree of a divisional area (i, j) is calculated for every divisional area by the following formula (1). The first element group of the characteristic vector V is then determined on the basis of the average value $e_{ij}$ of the conspicuous degree. The divisional area (i, j) shows an i-th (i=1 to N) area in the horizontal direction and a j-th (j=1 to M) area in the perpendicular direction in the retrieving object image.

Equation 1

$$e_{ij} \sum_{n=xi-s}^{n=xi+s} \sum_{m=yi-s}^{m=yi+s} e'_{nm} \quad (1)$$

When each divisional area is set to a square area constructed by 2s×2s pixels in the above formula (1), the average value $e_{ij}$ of the conspicuous degree of the divisional area (i, j) is calculated. In the above formula (1), xi shows the x-coordinate of a central point of the divisional area (i, j), and xj is the y-coordinate of the central point of the divisional area (i, j). Accordingly, in the first element group of the characteristic vector V, the average value $e_{ij}$ of the conspicuous degree of each divisional area is multiplied by each independent coefficient $E_{ij}$ by the following formula (2) and is enumerated as each element. When the retrieving object image is divided into N-areas in the horizontal direction and M-areas in the perpendicular direction, the first element group of the characteristic vector V is constructed by N×M elements.

Equation 2

$$(E_{11} \cdot e_{11}, E_{12} \cdot e_{12}, ---, E_{ij} \cdot e_{ij}, ---, E_{NM} \cdot e_{NM}) \quad (2)$$

In the second element group of the characteristic vector V, the face information f1 to f9 judged in the step S118 is respectively multiplied by independent coefficients $F_1$ to $F_9$ by the following formula (3), and is enumerated as each element.

Equation 3

$$(F_1 \cdot f_1, F_2 \cdot f_2, ---, F_9 \cdot f_9) \quad (3)$$

In the third element group of the characteristic vector V, the similar degree $p_k$ judged in the step S120 is multiplied by each independent coefficient $P_k$ by the following formula (4) and is enumerated as each element. For example, when K-person images are included in the retrieving key image, the similar degree to the face of a face area k (K=1 to K) included in the retrieving key image is calculated for each face area included in the retrieving object image. At this time, when it is similar to the face of the face area k (when the similar degree is a predetermined value or more), $p_k=1$ is set. In contrast to this, when it is not similar to the face of the face area k (when the similar degree is less than the predetermined value), $p_k=0$ is set.

Equation 4

$$(P_1 \cdot p_1, P_2 \cdot p_2, ---, P_k \cdot p_k, ---, P_K \cdot p_K) \quad (4)$$

Thus, the characteristic vector V is represented by enumerating the respective elements of the first, second and third element groups by the following formula (5).

Equation 5

$$V = (E_{11} \cdot e_{11}, E_{12} \cdot e_{12}, ---, E_{NM} e_{NM}, F_1 \cdot f_1, F_2 \cdot f_2, ---, F_9 \cdot f_9, P_1 \cdot p_1, P_2 \cdot p_2, ---, P_K \cdot p_K) \quad (5)$$

Next, the process proceeds to a step S126, and it is judged whether the processings of steps S108 to S124 are terminated or not with respect to all the retrieving object images of the retrieving object image registration DB 10. When it is judged that the processings are terminated with respect to all the retrieving object images (Yes), the process proceeds to the step S128. In the step S128, each retrieving object image is clustered Into plural clusters on the basis of the inter-vector distance between the characteristic vectors V of the retrieving object image. For example, the clustering can be performed on the basis of the conventional K-average method. In the K-average method, K-characteristic vectors V are suitably selected as first processing, and each selected characteristic vector $V_k$ (k=1 to K) is set to the central position of the cluster k. The central position of the cluster k is set to $m_k$. Next, the inter-vector distance between the characteristic vector $V_i$ (i=1 to N and N is a total number of the retrieving object image) and the central position $m_k$ of the cluster k is calculated by the following formula (6) as second processing, and the characteristic vector $V_i$ is set to belong to the cluster k in which the calculated inter-vector distance is minimum. In the following formula (6), the inter-vector distance between characteristic vectors $V_A$ and $V_B$ is calculated.

Equation 6

$$S = |V_A - V_B| \quad (6)$$

Next, the central position $m_k$ of the cluster k is replaced with an average value of the characteristic vector $V_i$ belonging to the cluster k as third processing. Next, in the case of i<N, "1" is added to i as fourth processing and the second and third processings are performed. When there is a change in $m_k$ before and after the change in the third processing, i=1 is set as fifth processing and the second and third processings are performed. In contrast to this, when there is no change in $m_k$ before and after the change in the third processing, or when the processing is repeatedly performed by a predetermined number of times or more, the processing is terminated and the central position $m_k$ of the cluster k and the characteristic vector $V_i$ belonging to this cluster k are determined.

Figure 6:
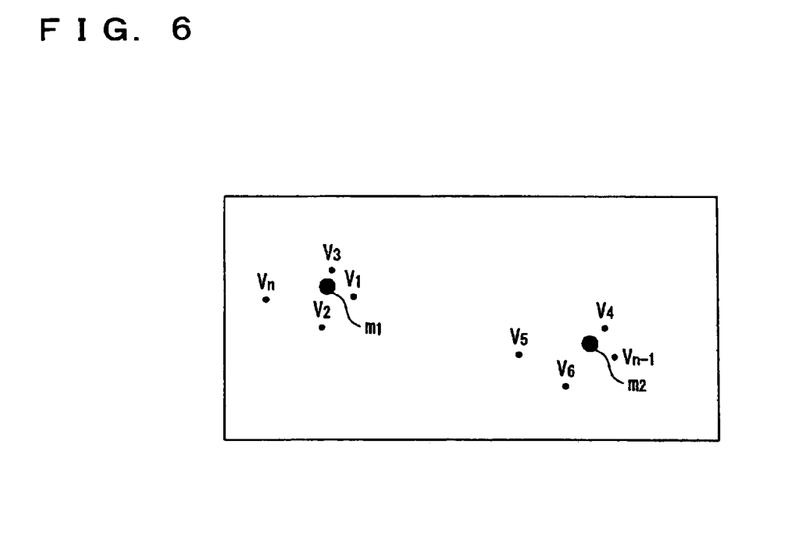
FIG. 6 is a view showing a case in which n-characteristic vectors V are clustered into two clusters.

FIG. 6 is a view showing a case in which n-characteristic vectors V are clustered into two clusters. In the example of FIG. 6, characteristic vectors $V_1$, $V_2$, $V_3$, $V_n$ belong to the cluster of the central position $m_1$, and characteristic vectors $V_4$, $V_5$, $V_6$, $V_{n-1}$ belong to the cluster of the central position $m_2$.

Next, the process proceeds to a step S130, and an image is retrieved from the retrieving object image registration DB 10 on the basis of a designated retrieving condition. When the similar image retrieving mode is designated as the retrieving condition, the retrieving object image corresponding to the characteristic vector V having a smallest inter-vector distance with respect to the characteristic vector V of the retrieving key image is retrieved and outputted from the retrieving object image registration DB 10. When the similar image group retrieving mode is designated as the retrieving condition, all retrieving object images to which the retrieving key image belongs within plural clusters are retrieved and outputted from the retrieving object image registration DB 10. When the variety retrieving mode is designated as the retrieving condition, a predetermined number of retrieving object images are retrieved and outputted from the retrieving object image registration DB 10 for every cluster.

Figure 7:
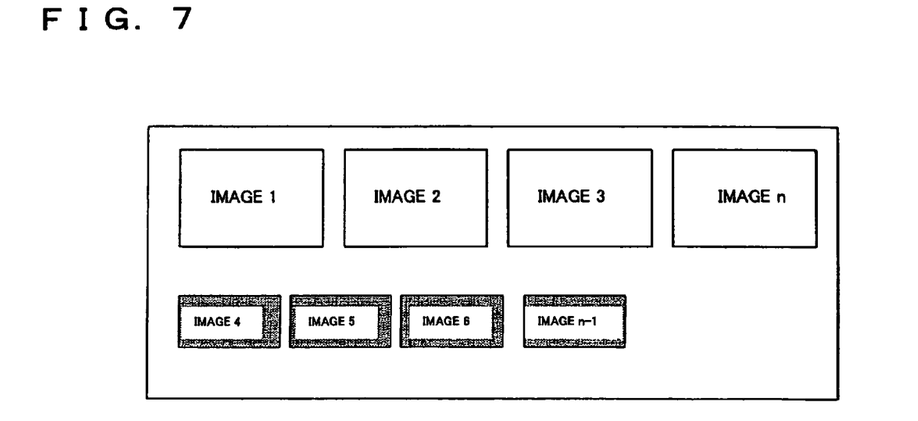
FIG. 7 is a view showing a display screen displaying a retrieving result.

Next, the process proceeds to a step S132, and the retrieved and outputted retrieving object image is displayed in the display device 64 in a designated display mode. A series of processings is then terminated and it is returned to the original processing. FIG. 7 is a view showing the display screen displaying a retrieving result. The example of FIG. 7 shows a case in which retrieving object images 1 to n are displayed in the enlargement display mode and the clear display mode. Since images 1, 2, 3, n are images retrieved and outputted as the retrieving result, these images are enlarged and are clearly displayed. In contrast to this, other images 4, 5, 6, n−1 are reduced in size and are gradated and displayed.

In contrast to this, when it is judged in the step S126 that no processings of steps S108 to S124 are terminated with respect to all the retrieving object images of the retrieving object image registration DB 10 (No), the process proceeds to a step S134 and the next retrieving object image is read from the retrieving object image registration DB 10, and the process proceeds to the step S108. Next, the operation of the image retrieving device in this embodiment will be explained.

First, a case in which the similar retrieval of an image is performed by the similar image retrieving mode will be explained. When the similar retrieval of the image is performed by the similar image retrieving mode, a user inputs a retrieving request, and designates the similar image retrieving mode as a retrieving mode and also designates the retrieving key image. Further, the user designates the display mode. When the similar image retrieving mode and the retrieving key image are designated in the image retrieving device 100, a head retrieving object image is read from the retrieving object image registration DB 10 via steps S106 to S110. A noticing area is then extracted from the read retrieving object image, and it is judged whether a face area is included in the retrieving object image or not. Next, the direction, the size and the gravity center position of the face of a person image included in the retrieving object image are judged on the basis of the judging result of the step S110 via steps S118, S120. Further, the similar degrees of the face of the person image included in the retrieving object image and the face of a person image included in the retrieving key image are judged. When the person images of plural photographed bodies are included in the retrieving object image, steps S110 to S120 are repeated and the face information and the similar degree are judged for each face area.

When the face information and the similar degree are next judged with respect to all the face areas of the retrieving object image, the characteristic vector V of the retrieving object image is generated on the basis of the extracted noticing area and the judged face information and similar degree via the step S124. When such processing is performed with respect to all the retrieving object images of the retrieving object image registration DB 10, each retrieving object image is clustered into plural clusters on the basis of the inter-vector distance between the characteristic vectors V of the retrieving object image via steps S128, S130. Since the similar image retrieving mode is designated, the retrieving object image corresponding to the characteristic vector V having a smallest inter-vector distance with respect to the characteristic vector V of the retrieving key image is retrieved and outputted from the retrieving object image registration DB 10. The retrieved and outputted retrieving object image is then displayed in the designated display mode via the step S132.

A case in which the similar retrieval of an image is performed by the similar image group retrieving mode will next be explained. When the similar retrieval of the image is performed by the similar image group retrieving mode, a user inputs a retrieving request and designates the similar image group retrieving mode as a retrieving mode and also designates the retrieving key image. The user also designates the display-mode. Processing is similar to that in the case in which the similar retrieval is performed in the similar image retrieving mode until each retrieving object image is clustered. When each retrieving object image is clustered in the image retrieving device 100, all the retrieving object images to which the retrieving Key image belongs within plural clusters are retrieved and outputted from the retrieving object image registration DB 10 since the similar image group retrieving mode is designated via the step S130. The retrieved and outputted retrieving object image is then displayed in the designated display mode via the step S132.

A case in which the similar retrieval of an image is performed by the variety retrieving mode will next be explained. When the similar retrieval of the image is performed by the variety retrieving mode, a user input a retrieving request and designates the variety retrieving mode as a retrieving mode. Further, the user designates the display mode. Processing is similar to that in the case in which the similar retrieval is performed in the similar image retrieving mode until each retrieving object image is clustered. When each retrieving object image is clustered in the image retrieving device 100, a predetermined number of retrieving object images are retrieved and outputted from the retrieving object image registration DB 10 for every cluster since the variety retrieving mode is designated via the step S130. The retrieved and outputted retrieving object image is then displayed in the designated display mode via the step S132.

Thus, in this embodiment, with respect to the retrieving key image and each retrieving object image, a noticing area is extracted from these images, and the characteristic vector V of each of these images is generated on the basis of the extracted noticing area with respect to the retrieving key image and each retrieving object image. An image adapted for the retrieving key image is retrieved from the retrieving object image registration DB 10 on the basis of the generated characteristic vector V.

Thus, since the retrieval is performed in consideration of a portion noticed by the user, the subjectivity of the user is reflected in the retrieving result. Accordingly, in comparison with the conventional case, it is possible to obtain the retrieving result comparatively adapted for a desire of the user.

Further, in this embodiment, with respect to the retrieving key image and each retrieving object image, the direction, the size or the gravity center position of the face of a person image included in these images is judged. With respect to the retrieving key image and each retrieving object image, the characteristic vector V of these images is generated on the basis of the judged direction, size or gravity center position of the face.

Thus, since the retrieval is performed in consideration of the direction, the size or the gravity center position of the face of the person image, it is possible to obtain a retrieving result adapted for the face of the person image included in the retrieving key image. Further, in this embodiment, the similar degrees of the face of the person image included in this retrieving object image and the face of the person image included in the retrieving key image are judged for each retrieving object image. With respect to the retrieving key image and each retrieving object image, the characteristic vector V of these images is generated on the basis of the judged similar degree.

Thus, since the retrieval is performed in consideration of the similar degrees of the faces of the person images, it is possible to obtain a retrieving result similar to that of the face of the person image included in the retrieving key image. Further, in this embodiment, the retrieving object image corresponding to the characteristic vector V having a smallest inter-vector distance with respect to the characteristic vector V of the retrieving key image is retrieved and outputted from the retrieving object image registration DB 10.

Thus, it is possible to obtain a retrieving result considered to be most adaptable to the desire of the user. Further, in this embodiment, each retrieving object image is classified into plural clusters on the basis of the inter-vector distance between the characteristic vectors V of the retrieving object image. Further, all the retrieving object images to which the retrieving key image belongs within the plural clusters are retrieved and outputted from the retrieving object image registration DB 10.

Thus, it is possible to obtain some retrieving results considered to be adapted for the desire of the user. Further, in this embodiment, each retrieving object image is classified into plural clusters on the basis of the inter-vector distance between the characteristic vectors V of the retrieving object image. Further, a predetermined number of retrieving object images are retrieved and outputted from the retrieving object image registration DB 10 for each cluster.

Thus, since a predetermined number of retrieving object images are retrieved and outputted from different clusters, various retrieving results can be obtained. In the above embodiment, the retrieving object image corresponds to the classifying object images of aspects 8 to 12, 15 or 17, and the retrieving object image registration DB 10 corresponds to the retrieving object image storage means of aspect 2, 5, 6, 14 or 16, or the classifying object image storage means of aspect 9, 12 or 15. The step S104 and the retrieving key image designating section 12 correspond to the retrieving key image inputting means of aspect 2 or 14, or the retrieving key image inputting step of aspect 16. The step S108 and the noticing area extracting section 16 correspond to the noticing area extracting means of aspect 2, 9, 14 or 15, the noticing area extracting step of aspect 17, the first noticing area extracting step of aspect 16, or the second noticing area extracting step of aspect 16.

Further, in the above embodiment, the step S118 and the face information judging section 36 correspond to the face information judging means of aspect 3 or 10. The step S120 and the similar degree judging section 38 correspond to the similar degree judging means of aspect 4 or 11. The step S124 and the characteristic vector generating means 20 correspond to the characteristic vector generating means of aspects 2 to 4, 9 to 11, 14 or 15, the second characteristic vector generating step of aspect 16, or the first characteristic vector generating step of aspect 16. Further, steps S128, S130 and the image retrieving section 24 correspond to the image retrieving means of aspect 2, 5, 6 or 14, the image classifying means of aspect 9, 12 or 15, the image retrieving step of aspect 16, or the image classifying step of aspect 17.

Figure 8:
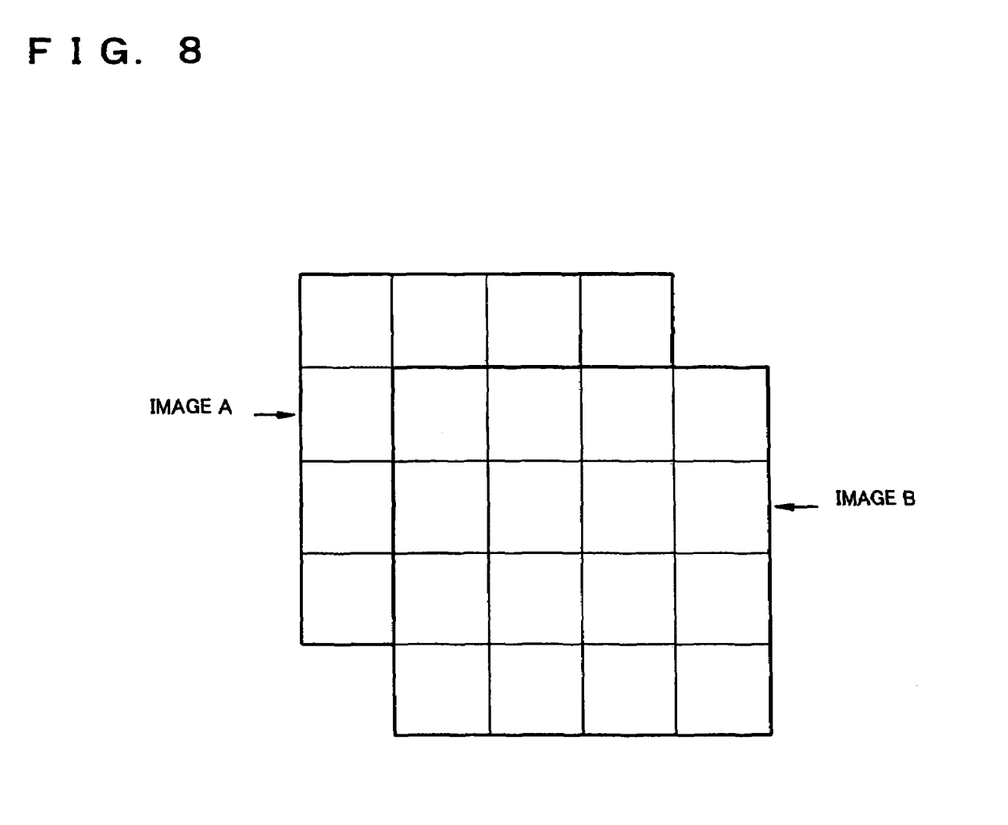
FIG. 8 is a view showing a case in which retrieving object images A, B of different aspect ratios are overlapped.

In the above embodiment, no aspect ratio of the retrieving object image is particularly explained. However, when the aspect ratio of the retrieving object image is different, the similarity of the image is judged as follows. FIG. 8 is a view showing a case in which retrieving object images A, B of different aspect ratios are overlapped.

When the similarity of the retrieving object images A, B of different aspect ratios is judged, the retrieving object images A, B are. overlapped as shown in FIG. 8. A characteristic vector $V_A$ of the retrieving object image A is generated with respect to the overlapping area within the retrieving object image A. Further, a characteristic vector $V_B$ of the retrieving object image B is generated with respect to the overlapping area within the retrieving object image B. The similarity of the retrieving object images A, B is then judged on the basis of the generated characteristic vectors $V_A$, $V_B$.

In this case, the retrieving object images A, B may be further overlapped by changing the overlapping method of the retrieving object images A, B so as to set the overlapping area to be different. An average value of the characteristic vector $V_{Ai}$ (i=1 to N and N is a combination total number) of the retrieving object image A calculated for each combination may be generated as the characteristic vector $V_A$ of the retrieving object image A. An average value of the characteristic vector $V_{Bi}$ of the retrieving object image B calculated for each combination may be also generated as the characteristic vector $V_B$ of the retrieving object image B.

Thus, the similarity can also be comparatively accurately judged with respect to the retrieving object images of different aspect ratios. Accordingly, it is possible to obtain a retrieving result further adaptable to the desire of the user. In this case, the step S124 and the characteristic vector generating section 20 correspond to the characteristic vector generating means of aspect 7 or 13.

Further, in the above embodiment, the first element group of the characteristic vector V is constructed so as to be generated such that the average value $e_{ij}$ of the conspicuous degree of each divisional area is multiplied by each independent coefficient $E_{ij}$ by the above formula (2) and is enumerated as each element. However, the first element group is not limited to this case. When the conspicuous degree is used to calculate the noticing area, the conspicuous degree is constant in the divided area. Accordingly, the first element group can be also generated as follows in the step S108. First, H-noticing areas are selected in the order of a high conspicuous degree from the retrieving object image. Next, a central coordinate $X_h$ of a noticing area h (h=1 to H) in its horizontal direction is multiplied by a coefficient X, and a central coordinate $y_h$ of the noticing area h in its perpendicular direction is multiplied by a coefficient $y_h$ by the following formula (7). Further, a noticing degree $e_h$ of the noticing area h is multiplied by a coefficient E, and an area $S_h$ of the noticing area h is multiplied by a coefficient S. Values provided by enumerating these values $Xx_h$, $Yy_h$, $Ee_h$, $Ss_h$ as each element are generated as the first element group of the characteristic vector V.

Equation 7

$$(X \cdot x_1, Y \cdot y_1, E \cdot e_1, S \cdot s_1, \text{---} X \cdot x_h, Y \cdot y_h, E \cdot e_h, S \cdot s_h, \text{---}, X \cdot x_H, Y \cdot y_H, E \cdot e_H, S \cdot s_H) \quad (7)$$

In this case, when the number h of extracted noticing areas is less than a predetermined number (e.g., 10), all the first element groups of the characteristic vector V are set to "0". Further, in the above embodiment, when the processing shown in the flow chart of FIG. 3 is executed, the control program stored to the ROM 52 in advance is executed in the above explanation. However, the present invention is not limited to this case, but a program showing these procedures may be read to the RAM 54 from a storage medium storing this program thereto and may be also executed.

Here, the storage medium is a semiconductor storage medium such as RAM,. ROM, etc., a magnetic storage type storage medium such as FD, HD, etc., an optical reading system storage medium such as CD, CDV, LD, DVD, etc., a magnetic storage type/optical reading system storage medium such as MO, etc. The storage medium includes all storage media if this storage medium can be read by a computer irrespective of electronically, magnetically, optically reading methods, etc.

Further, in the above embodiment, the image retrieving system, the image classifying system, the image retrieving program, the image classifying program, the image retrieving method and the image classifying method in the present invention are applied to the case in which the similar retrieval of an image is performed in consideration of a portion noticed by a user. However, the present invention is not limited to this case, but can be also applied to other cases in the scope not departing from the features of the present invention. For example, the present invention can be applied to a case in which the image is classified.

What is claimed is:

1. An image retrieving system for retrieving an image adapted for a given retrieving key image from plural retrieving object images on the basis of the given retrieving key image, the system comprising:
an extractor extracting a noticing area from the retrieving key image and each retrieving object image;
a face information judging section for judging face information of a person image included in the retrieving key image and each retrieving object image;
a similar degree judging section for judging similar degrees of a face of a person image included in the retrieving object image and a face of a person image included in the retrieving key image for each retrieving object image;
a generator generating a characteristic vector showing a character of the images on the basis of the extracted noticing area, on the basis of the face information judged by the face information judging section, and on the basis of a judging result of the similar degree judging section, with respect to the retrieving key image and each retrieving object image, the characteristic vector being constructed by a first element group according to a conspicuous degree of the extracted noticing area, a second element group according to face information f1 to f9 according to a direction, a size, and a gravity center position of the face of the person image included in the retrieving key image and judged by the face information judging section, and a third element group according to a similar degree judged by the similar degree judging section, f1 being a sum total of an area occupied by the face of the person image, f2 being an average value of the area occupied by the face of the person image, f3 being a dispersion of the area occupied by the face of the person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and
a retriever retrieving the image adapted for the retrieving key image from the plural retrieving object images on the basis of the generated characteristic vector.

2. An image retrieving system for retrieving an image adapted for a given retrieving key image from plural retrieving object images on the basis of the given retrieving key image, the image retrieving system comprising:
a retrieving object image storage database for storing the plural retrieving object images;
a retrieving key image input device for inputting the retrieving key image;
an extractor for extracting a noticing area from the images with respect to the retrieving key image inputted by the retrieving key image input device and each retrieving object image of the retrieving object image storage database;
a face information judging section for judging face information of a person image included in the images with respect to the retrieving key image and each retrieving object image;
a similar degree judging section for judging similar degrees of a face of a person image included in the retrieving object image and a face of a person image included in the retrieving key image for each retrieving object image;
a characteristic vector generator for generating a characteristic vector showing a character of the images on the basis of the noticing area extracted by the extractor, on the basis of the face information judged by the face information judging section, and on the basis of the judging result of the similar degree judging section, with respect to the retrieving key image and each retrieving object image, the characteristic vector being constructed by a first element group according to a conspicuous degree of the noticing area, a second element group according to face information f1 to f9 according to a direction, a size, and a gravity center position of the face of the person image included in the retrieving key image for each retrieving object image and judged by the face information judging section, and a third element group according to a similar degree judged by the similar degree judging section f1 being a sum total of an area occupied by the face of the person image, f2 being an average value of the area occupied by the face of the person image, f3 being a dispersion of the area occupied by the face of the person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and
an image retrieving section for retrieving the image adapted for the retrieving key image from the retrieving object image storage database on the basis of the characteristic vector generated by the characteristic vector generator.

3. The image retrieving system according to claim 2, wherein the image retrieving section is constructed such that the retrieving object image corresponding to the characteristic vector having a smallest inter-vector distance with respect to the characteristic vector of the retrieving key image is retrieved and outputted from the retrieving object image storage database.

4. The image retrieving system according to claim 2, wherein the image retrieving section is constructed such that each retrieving object image is classified into plural groups on the basis of the inter-vector distance between the characteristic vectors of the retrieving object image, and all the retrieving object images to which the retrieving key image belongs within the plural groups are retrieved and outputted from the retrieving object image storage database.

5. The image retrieving system according to claim 2, wherein, when the aspect ratios of the retrieving key image and the retrieving object image or the aspect ratios of the retrieving object images are different from each other, the characteristic vector generator overlaps first and second images having the different aspect ratios, and generates the characteristic vector of the first image with respect to the overlapping area within the first image, and also generates the characteristic vector of the second image with respect to the overlapping area within the second image.

6. An image classifying system for classifying plural classifying object images comprising:

an extractor extracting a noticing area from the classifying object images for each classifying object image;

a generator generating a characteristic vector showing a character of the classifying object images on the basis of the extracted noticing area, the characteristic vector being constructed by a first element group according to a conspicuous degree of the extracted noticing area, a second element group according to face information f1 to f9 according to a direction, a size, and a gravity center position of a face of a person image included in each classifying object image, and a third element group according to a similar degree judged by a similar degree judging section, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and a classifier classifying each classifying object image into plural groups on the basis of the generated characteristic vector.

7. An image classifying system for classifying plural classifying object images comprising:

a classifying object image storage database for storing the plural classifying object images;

an extractor for extracting a noticing area from the classifying object images for each classifying object image of the classifying object image storage database;

a characteristic vector generator for generating a characteristic vector showing a character of the classifying object image for each classifying object image on the basis of the noticing area extracted by the extractor, the characteristic vector being constructed by a first element group according to a conspicuous degree of the noticing area extracted by the extractor, a second element group according to face information f1 to f9 according to a direction, a size, and a gravity center position of a face of a person image included in each classifying object image, and a third element group according to a similar degree judged by a similar degree judging section, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and a classifier for classifying each classifying object image into plural groups on the basis of the characteristic vector generated by the characteristic vector generator.

8. The image classifying system according to claim 7, wherein the image classifying system further comprises:

a face information judging section for judging face information of a person image included in the classifying object image for each classifying object image; and wherein the characteristic vector generator generates the characteristic vector showing the character of the classifying object image for each classifying object image on the basis of the face information judged by the face information judging section.

9. The image classifying system according to claim 7, wherein the image classifying system further comprises:

the similar degree judging section for judging similar degrees of a face of a person image included in the classifying object image for each classifying object image and a face of a person image included in a specific image; and wherein the characteristic vector generator generates the characteristic vector showing the character of the classifying object image for each classifying object image on the basis of the judging result of the similar degree judging section.

10. The image classifying system according to claim 7, wherein the classifier classifies each classifying object image into the plural groups on the basis of the inter-vector distance between the characteristic vectors of the classifying object image, and a predetermined number of classifying object images are retrieved and outputted from the classifying object image storage database for each group.

11. The image classifying system according to claim 7, wherein, when the aspect ratios of the classifying object images are different from each other, the characteristic vector generator overlaps first and second images having the different aspect ratios, and generates the characteristic vector of the first image with respect to the overlapping area within the first image, and also generates the characteristic vector of the second image with respect to the overlapping area within the second image.

12. A computer-readable medium storing an image retrieving program for retrieving an image adapted for a given retrieving key image from plural retrieving object images on the basis of the given retrieving key image, the image retrieving program comprising:

an extractor for extracting a noticing area from the images with respect to the retrieving key image inputted by a retrieving key image input device and each retrieving object image of a retrieving object image storage database about a computer capable of utilizing the retrieving object image storage database for storing the plural retrieving object images and the retrieving key image device for inputting the retrieving key image;

a generator for generating a characteristic vector showing a character of the images on the basis of the noticing area extracted by the extractor with respect to the retrieving key image and each retrieving object image, the characteristic vector being constructed by a first element group according to a conspicuous degree of the noticing area, a second element group according to face information f1 to f9 according to a direction, a size, and a gravity center position of a face of a person image included in the retrieving key image and judged by a face information judging section, and a third element group according to a similar degree judged by a similar degree judging section, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and a retriever for retrieving the image adapted for the retrieving key image from the retrieving object image storage database on the basis of the characteristic vector generated by the generator.

13. A computer-readable medium storing an image classifying program for classifying plural classifying object images, the image classifying program comprising:

an extractor for extracting a noticing area from the classifying object image for each classifying object image of a classifying object image storage database with respect to a computer capable of utilizing the classifying object image storage database for storing the plural classifying object images;

a generator for generating a characteristic vector showing a character of the classifying object image for each classifying object image on the basis of the noticing area extracted by the extractor, the characteristic vector being constructed by a first element group according to a conspicuous degree of the noticing area, a second element group according to face information f1 to f9 according to a direction, a size, and a gravity center position of a face of a person image included in each classifying object image, and a third element group according to a similar degree judged by a similar degree judging section, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image; and a classifier for classifying each classifying object image into plural groups on the basis of the characteristic vector generated by the generator.

14. An image retrieving method for retrieving an image adapted for a given retrieving key image from a retrieving object image storage database storing plural retrieving object images thereto on the basis of the given retrieving key image, the method comprising:

inputting the retrieving key image;

extracting a noticing area from the inputted retrieving key image;

generating a characteristic vector showing a character of the retrieving key image on the basis of the extracted noticing area;

extracting the noticing area from the retrieving object image;

generating a characteristic vector showing a character of the retrieving object image on the basis of the extracted noticing area, the characteristic vector being constructed by a first element group according to a conspicuous degree of the noticing area, a second element group according to face information f1 to f9 according to a direction, a size, and a gravity center position of a face of a person image included in the retrieving key image, and a third element group according to a similar degree based on judging face information of the person image in the retrieving key image and in each retrieving object image, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image;

repeatedly executing the extracting and generating for each retrieving object image of the retrieving object image storage database; and retrieving the image adapted for the retrieving key image from the retrieving object image storage database on the basis of the generated characteristic vectors.

15. An image classifying method for classifying plural classifying object images, the method comprising:

extracting a noticing area from the classifying object images;

generating a characteristic vector showing a character of the classifying object image on the basis of the extracted noticing area, the characteristic vector being constructed by a first element group according to a conspicuous degree of the extracted noticing area, a second element group according to face information f1 to f9 according to a direction, a size, and a gravity center position of a face of a person image included in each classifying object image, and a third element group according to a similar degree based on judging face information of the person image in each classifying object image, f1 being a sum total of an area occupied by the face of the person image, f2 being an average value of the area occupied by the face of the person image, f3 being a dispersion of the area occupied by the face of ther person image, f4 being an average of a horizontal direction front face directing degree, f5 being a dispersion of the horizontal direction front face directing degree, f6 being an average value of a perpendicular direction front face directing degree, f7 being a dispersion of the perpendicular direction front face directing degree, f8 being an average value of each gravity center position of the face of the person image, and f9 being a dispersion of each gravity center position of the face of the person image;

repeatedly executing the extracting and generating for each classifying object image; and classifying each classifying object image into plural groups on the basis of the generated characteristic vector.

* * * * *